(12) United States Patent
Wu et al.

(10) Patent No.: US 11,982,860 B2
(45) Date of Patent: May 14, 2024

(54) OPTICAL MEMBER DRIVING MECHANISM

(71) Applicant: TDK TAIWAN CORP., Taoyuan (TW)

(72) Inventors: Chia-Che Wu, Taoyuan (TW);
Sung-Mao Tsai, Taoyuan (TW);
Chao-Chang Hu, Taoyuan (TW);
Che-Wei Chang, Taoyuan (TW);
Chen-Hsien Fan, Taoyuan (TW);
Chih-Wei Weng, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 98 days.

(21) Appl. No.: 17/716,758

(22) Filed: Apr. 8, 2022

(65) Prior Publication Data

US 2022/0229261 A1 Jul. 21, 2022

Related U.S. Application Data

(63) Continuation of application No. 16/727,393, filed on Dec. 26, 2019, now Pat. No. 11,340,418.
(Continued)

(30) Foreign Application Priority Data

Dec. 20, 2019 (EP) .................................... 19218896

(51) Int. Cl.
*G02B 7/02* (2021.01)
*G02B 3/14* (2006.01)
(Continued)

(52) U.S. Cl.
CPC ................. *G02B 7/02* (2013.01); *G02B 3/14* (2013.01); *G02B 6/3514* (2013.01); *G02B 7/08* (2013.01);
(Continued)

(58) Field of Classification Search
CPC ... G02B 7/08; G02B 7/09; G02B 7/02; G02B 7/023; G02B 7/04; G02B 7/182;
(Continued)

(56) References Cited

U.S. PATENT DOCUMENTS

2017/0207678 A1\* 7/2017 Gutierrez ................. H02K 5/24
2019/0227256 A1\* 7/2019 Kuo ...................... G02B 7/1821

\* cited by examiner

*Primary Examiner* — William R Alexander
*Assistant Examiner* — Tamara Y. Washington
(74) *Attorney, Agent, or Firm* — Muncy, Geissler, Olds & Lowe, P.C.

(57) ABSTRACT

An optical member driving mechanism is provided. The optical member driving mechanism includes a fixed portion, a movable portion, an electromagnetic driving assembly and an elastic member. The fixed portion has a base and a frame that is disposed on the base. The movable portion is movable relative to the fixed portion, and includes a carrier for carrying an optical member with an incident optical axis. The carrier includes a body and a sidewall that extends along the edge of the body, wherein the carrier further includes a first stopping portion and a second stopping portion protruding towards the fixed portion. The electromagnetic driving assembly drives the movable portion to move relative to the fixed portion. The movable portion is movably connected to the fixed portion via the elastic member.

16 Claims, 7 Drawing Sheets

Related U.S. Application Data

(60) Provisional application No. 62/785,593, filed on Dec. 27, 2018.

(51) Int. Cl.
| | |
|---|---|
| *G02B 6/35* | (2006.01) |
| *G02B 7/08* | (2021.01) |
| *G02B 7/09* | (2021.01) |
| *G02B 7/182* | (2021.01) |
| *G02B 26/08* | (2006.01) |
| *G02B 27/64* | (2006.01) |
| *H04N 23/55* | (2023.01) |
| *H04N 23/57* | (2023.01) |
| *H04N 23/58* | (2023.01) |
| *H04N 23/68* | (2023.01) |
| *G02B 23/08* | (2006.01) |

(52) U.S. Cl.
CPC ............... *G02B 7/09* (2013.01); *G02B 7/182* (2013.01); *G02B 26/0816* (2013.01); *G02B 27/646* (2013.01); *H04N 23/55* (2023.01); *H04N 23/57* (2023.01); *H04N 23/58* (2023.01); *H04N 23/687* (2023.01); *G02B 23/08* (2013.01); *G03B 2205/0069* (2013.01)

(58) Field of Classification Search
CPC .......... G02B 7/022; G02B 7/102; G02B 7/14; G02B 7/021; G02B 7/025; G02B 7/18; G02B 7/24; G02B 7/28
See application file for complete search history.

OPTICAL MEMBER DRIVING MECHANISM

CROSS REFERENCE TO RELATED APPLICATIONS

This application is a Continuation of pending U.S. patent application Ser. No. 16/727,393, filed Dec. 26, 2019 and entitled "OPTICAL MEMBER DRIVING MECHANISM", which claims the benefit of U.S. Provisional Application No. 62/785,593, filed Dec. 27, 2018, and claims priority of EU Patent Application No. 19818896.9, filed Dec. 20, 2019, the entirety of which are incorporated by reference herein.

BACKGROUND

Technical Field

The disclosure relates to an optical member driving mechanism, and in particular to an optical member driving mechanism including an elastic member that overlaps with a sidewall of the carrier.

Description of the Related Art

With the development of technology, many electronic devices (such as smartphones and digital cameras) nowadays are able perform the same functions as a camera or a video recorder. The use of such electronic devices has become increasingly widespread, and these electronic devices have been designed to be convenient and compact, to provide users with more choices.

Electronic devices with a camera or video-recorder function usually have a lens driving module to drive a lens to move along the optical axis. Therefore, an autofocus (AF) and/or optical image stabilization (OIS) function is achieved. Light may pass through the lens and form an image on a photosensitive member.

However, during the formation of an optical image, external noise usually enters the photosensitive member due to reflection. As a result, the image quality is usually not good enough to meet user demands on image quality. Therefore, how to solve the aforementioned problem has become an important topic.

BRIEF SUMMARY

The present disclosure provides an optical member driving mechanism. The optical member driving mechanism includes a fixed portion, a movable portion, an electromagnetic driving assembly and an elastic member. The fixed portion has a base and a frame that is disposed on the base. The movable portion is movable relative to the fixed portion, and includes a carrier for carrying an optical member with an incident optical axis. The carrier includes a body and a sidewall that extends along the edge of the body. The electromagnetic driving assembly drives the movable portion to move relative to the fixed portion. The movable portion is movably connected to the fixed portion via the elastic member, wherein as viewed along the incident optical axis, the sidewall and the elastic member at least partially overlap.

In an embodiment, the carrier further includes a first stopping portion and a second stopping portion that protrude towards the fixed portion, when viewed in a direction that is perpendicular to the incident optical axis, the elastic member is located between the first stopping portion and the second stopping portion. In an embodiment, when viewed along the incident optical axis, the first stopping portion and the second stopping portion overlap with the elastic member.

In an embodiment, the base has a first groove that is disposed to contain the first stopping portion, and when viewed along the incident optical axis, the first groove overlaps with the elastic member. In an embodiment, the frame has a second groove that is disposed to contain the second stopping portion, and when viewed along the incident optical axis, the second groove overlaps with the elastic member.

In an embodiment, the carrier further includes a protruding column that protrudes towards the fixed portion, and the direction in which the protruding column extends is substantially perpendicular to the direction in which the first stopping portion and the second stopping portion extend. In an embodiment, the base has a recess formed to contain the protruding column, and when viewed along the incident optical axis, the recess overlaps with the protruding column. In an embodiment, the optical member driving mechanism further includes a damping material that is disposed between the protruding column and at least one surface of the recess.

In an embodiment, the first stopping portion and the second stopping portion protrude from the sidewall to the fixed portion. In an embodiment, the optical member has an outlet optical axis, and the incident optical axis is substantially perpendicular to the outlet optical axis. In an embodiment, the optical member driving mechanism further includes a lens driving assembly that carries a lens that corresponds to the optical member, wherein the movable portion and the lens driving assembly are arranged in the outlet optical axis. In an embodiment, the fixed portion further includes a housing, and the movable portion and the lens driving assembly are disposed in the housing.

In an embodiment, the electromagnetic driving assembly further includes a magnetic member and a driving coil, the magnetic member or the driving coil is disposed on the fixed portion, the other of the magnetic member or the driving coil is disposed on the movable portion, and when viewed along the incident optical axis, the movable portion overlaps with the driving coil and the magnetic member. In an embodiment, the optical member driving mechanism further includes a sensor for detecting the movement of the movable portion relative to the fixed portion, wherein the sensor or the magnetic member is disposed on the fixed portion, the other of the sensor or the magnetic member is disposed on the movable portion, and when viewed along the incident optical axis, the sensor and the movable portion overlap. In an embodiment, the sensor is disposed in the driving coil, the base has a base opening, and the sensor and the driving coil are exposed from the base opening.

In an embodiment, the carrier further has a plurality of adhesive grooves that are disposed to face the optical member. In an embodiment, an acute angle is formed between the extending direction of the adhesive grooves and the incident optical axis. In an embodiment, the carrier further has a contact, the elastic member is connected to the carrier via the contact, and when the optical member is viewed along the incident optical axis, the contact is not exposed from the carrier.

In an embodiment, the fixed portion further includes a circuit component, and the base is disposed between the frame and the circuit component. In an embodiment, the fixed portion further includes a bottom plate, and the circuit component is disposed between the base and the bottom plate.

BRIEF DESCRIPTION OF THE DRAWINGS

The disclosure can be more fully understood by reading the subsequent detailed description and examples with references made to the accompanying drawings, wherein.

DETAILED DESCRIPTION OF THE INVENTION

The optical member driving mechanisms of some embodiments of the present disclosure are described in the following description. However, it should be appreciated that the following detailed description of some embodiments of the disclosure provides various concepts of the present disclosure which may be performed in specific backgrounds that can vary widely. The specific embodiments disclosed are provided merely to clearly describe the usage of the present disclosure by some specific methods without limiting the scope of the present disclosure.

In addition, relative terms such as "lower" or "bottom," "upper" or "top" may be used in the following embodiments in order to describe the relationship between one element and another element in the figures. It should be appreciated that if the device shown in the figures is flipped upside-down, the element located on the "lower" side may become the element located on the "upper" side. Moreover, the term "overlap" may be used in the present disclosure, and means that when viewed in a certain direction, the areas of two elements partial coincide or completely coincide.

It should be understood that although the terms "first," "second," "third," etc. may be used herein to describe various elements, materials and/or portions, these elements, materials and/or portions are not limited by the above terms. These terms merely serve to distinguish different elements, materials and/or portions. Therefore, a first element, material and/or portion may be referred to as a second element, material and/or portion without departing from the teaching of some embodiments in the present disclosure.

Unless defined otherwise, all terms (including technical and scientific terms) used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure. In addition, the terms "substantially," "approximately" or "about" may also be recited in the present disclosure, and these terms are intended to encompass situations or ranges that is substantially or exactly the same as the description herein. It should be noted that unless defined specifically, even if the above terms are not recited in the description, it should be read as the same meaning as those approximate terms are recited.

Figure 1:
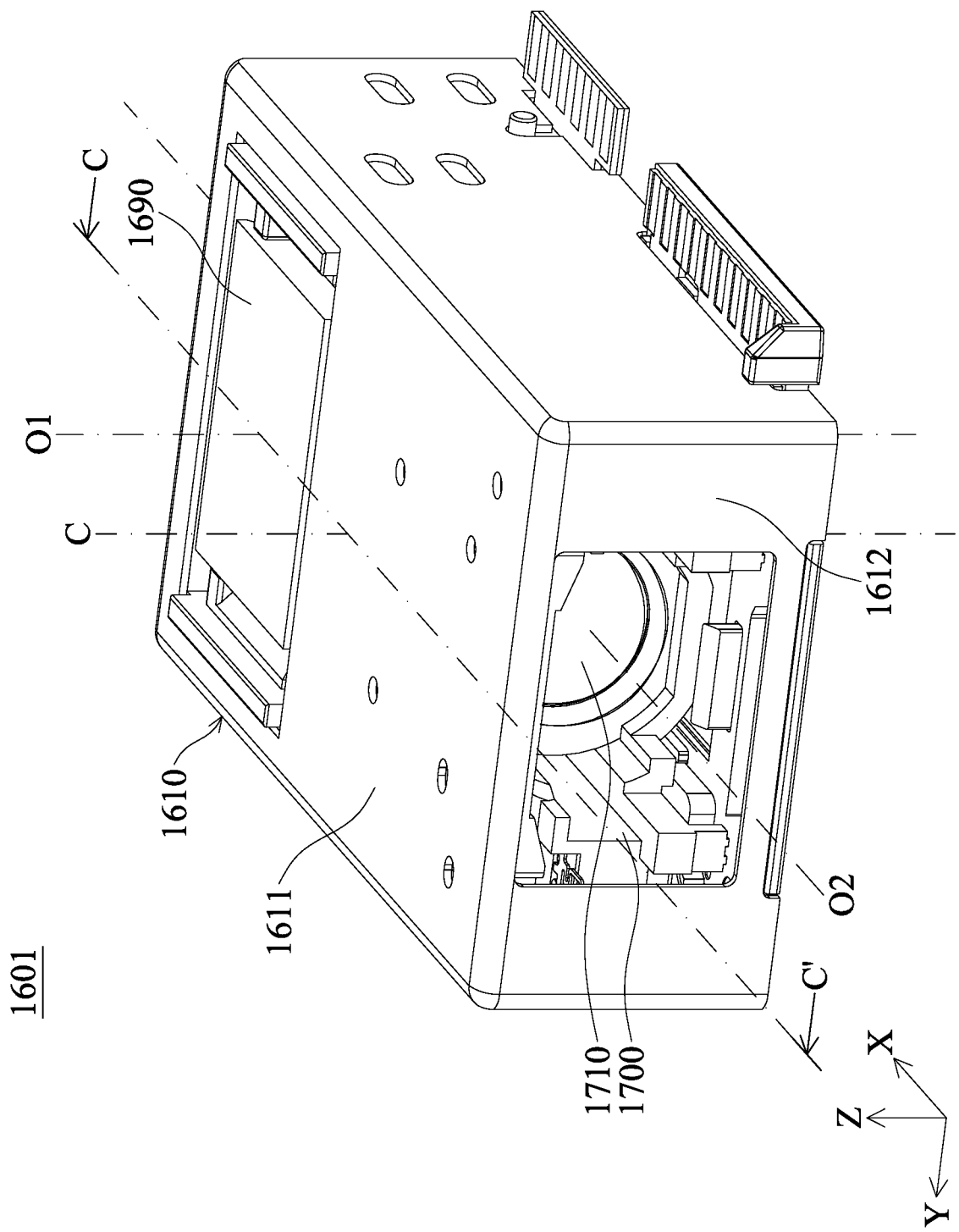
FIG. 1 is a perspective view illustrating an optical member driving mechanism in accordance with an embodiment of the present disclosure.

FIG. 1 is a schematic perspective view illustrating an optical member driving mechanism 1601 in accordance with an embodiment of the present disclosure. It should be noted that, in this embodiment, the optical member driving mechanism 1601 may be, for example, disposed in the electronic devices with camera function for driving an optical member 1690, and can perform an autofocus (AF) and/or optical image stabilization (OIS) function.

As shown in FIG. 1, the optical member driving mechanism 1601 has a central axis C that is substantially parallel to the Z axis. The optical member driving mechanism 1601 has an incident optical axis O1 and an output optical axis O2. After the light enters the optical member 1690 along the incident optical axis O1, the direction of the light may be changed and the light may travel in the output optical axis O2. In the present embodiment, the incident optical axis O1 is substantially parallel to the central axis C (the Z axis), and the output optical axis O2 is substantially parallel to the X axis. The optical member driving mechanism 1601 includes a housing 1610 which has a top surface 1611 and a first side surface 1612. The top surface 1611 extends in a direction that is parallel to the output optical axis O2 (i.e. the X-Y plane). The first side surface 1612 extends from an edge of the top surface 1611 along a direction (the Z axis) that is parallel to the incident optical axis O1. In some embodiments, the first side surface 1612 extends from the edge of the top surface 1611 along a direction that is not parallel to the incident optical axis O1.

The optical member driving mechanism 1601 further includes a lens driving assembly 1700 that is disposed in the housing 1610 of the optical member driving mechanism 1601. The lens driving assembly 1700 may carry a lens 1710 that corresponds to the optical member 1690. The lens 1710 may perform an optical treatment to the light entering the optical member driving mechanism 1601, wherein the light passes through the lens 1710 of the lens driving assembly 1700 in the output optical axis O2 that is substantially parallel to the X axis. In some embodiments, the light passing the optical member 1690 may passes through the lens 1710 in the output optical axis O2.

In the present embodiment, the output optical axis O2 is substantially perpendicular to the incident optical axis O1, but it is not limited thereto. In some embodiments, the output optical axis O2 is not parallel to the incident optical axis O1. In conclusion, the optical member 1690 may change the direction of the light, such that after the light enters the optical member driving mechanism 1601 along the incident optical axis O1, it may exit the optical member driving mechanism 1601 along the output optical axis O2. After the light exits the optical member driving mechanism 1601, it may travel to an image sensor (not shown) that is disposed out of the optical member driving mechanism 1601, and thereby an image may be generated on the electronic device.

Figure 2:
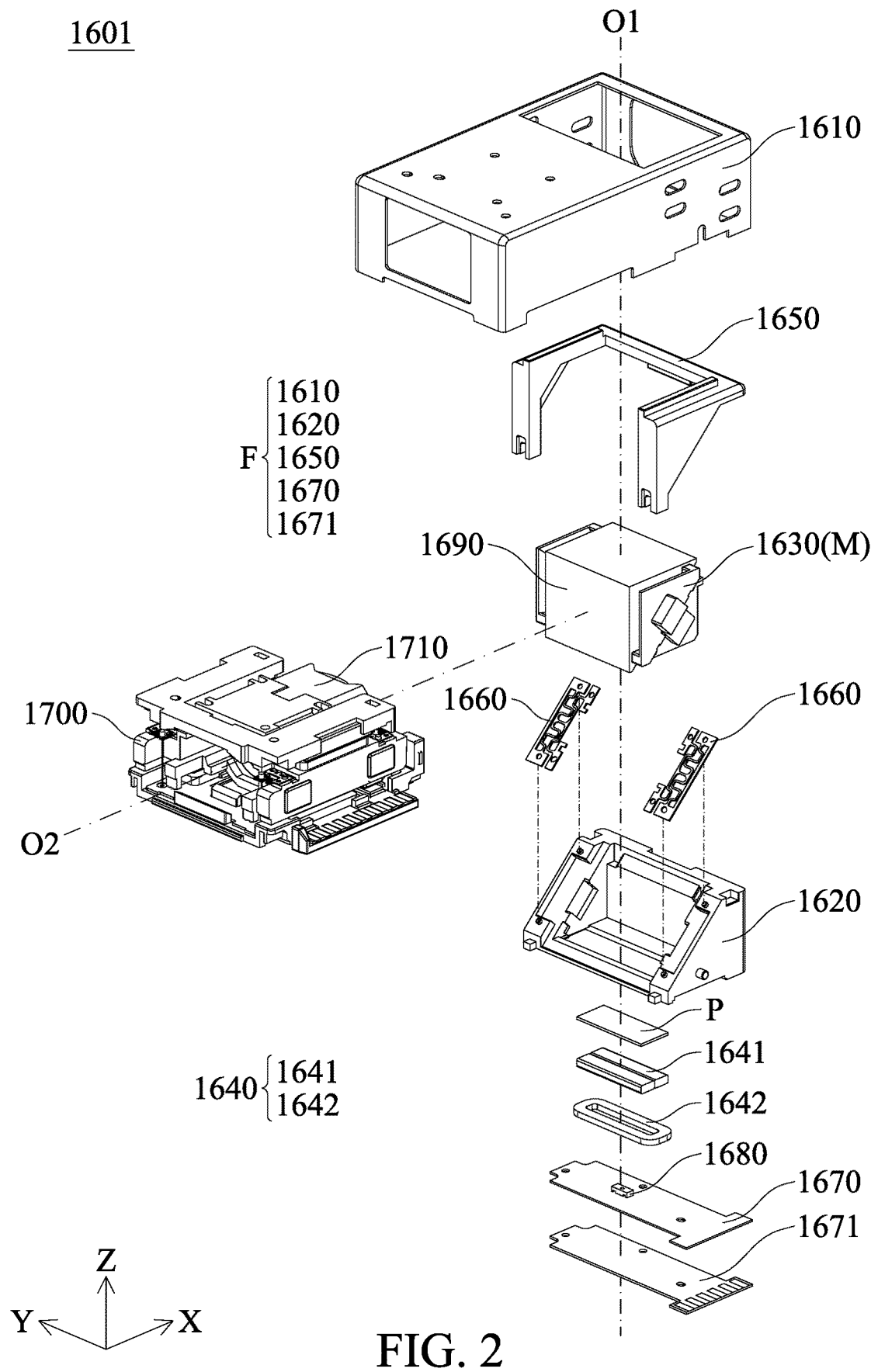
FIG. 2 is an exploded view illustrating the optical member driving mechanism shown in FIG. 1.

FIG. 2 is an exploded view illustrating the optical member driving mechanism 1601 shown in FIG. 1. In the present embodiment, the optical member driving mechanism 1601 has a substantial rectangular structure. As shown in FIG. 2, the optical member driving mechanism 1601 mainly includes a fixed portion F, a movable portion M, an electromagnetic driving assembly 1640, a plurality of elastic members 1660, and a lens driving assembly 1700. The fixed portion F includes a housing 1610, a base 1620, a frame 1650, a circuit component 1670 and a bottom plate 1671.

The housing 1610 is disposed on the base 1620, and protect the elements (such as the movable portion M and the lens driving assembly 1700) disposed inside the optical member driving mechanism 1601 (i.e. disposed in the housing 1610). In some embodiments, the housing 1610 is made of metal or another material with sufficient hardness to provide good protection. The frame 1650 is disposed on the base 1620 and affixed to the housing 1610. The circuit component 1670 is disposed below the base 1620 for transmitting electric signals, performing the autofocus (AF) and/or optical image stabilization (OIS) function. For example, the optical member driving mechanism 1601 may control the position of the optical member 1690 based on the aforementioned electric signals so as to form an image. In the present embodiment, the bottom plate 1671 is disposed below the circuit component 1670, protecting the circuit component 1670 and enhancing the structural strength of the circuit component 1670. In other words, the base 1620 is disposed between the frame 1650 and the circuit component 1670, and the circuit component 1670 is disposed between the base 1620 and the bottom plate 1671.

The movable portion M is movable relative to the fixed portion F. The movable portion M mainly includes a carrier 1630 which carries the optical member 1690. As shown in FIG. 2, the carrier 1630 is movably connected to the frame 1650 and the base 1620. The elastic members 1660 are disposed on the carrier 1630, and are connected to the base 1020 and the carrier 1630. For example, the elastic members 1660 are made of metal or another suitable elastic material.

The electromagnetic driving assembly 1640 includes a magnetic member 1641 and a driving coil 1642. The magnetic member 1641 is disposed below the carrier 1630, and the corresponding driving coil 1042 is disposed on the circuit component 1670. When current is applied to the driving coil 1642, an electromagnetic driving force may be generated by the driving coil 1642 and the magnetic member 1641 (i.e. the electromagnetic driving assembly 1640) to drive the carrier 1630 and the optical member 1690 to move along a horizontal direction (the X-Y plane) relative to the base 1620, performing the autofocus (AF) and/or optical image stabilization (OIS) function. In the present embodiment, when viewed along the incident optical axis O1, the carrier 1630 overlaps with the magnetic member 1641 and the driving coil 1642.

In addition, the carrier 1630 may be movably suspended between the frame 1650 and the base 1620 by the electromagnetic driving force of the electromagnetic driving assembly 1640, and the force exerted by the elastic members 1660. Furthermore, a magnetic permeable plate P is disposed on the magnetic member 1641 for concentrating the magnetic field of the magnetic member 1641 so that the efficiency of the electromagnetic driving assembly 1640 may be improved. In some embodiments, the magnetic permeable plate P may be made of metal or another material with sufficient magnetic permeability.

In the present embodiment, a sensor 1680 is disposed on the circuit component 1670, and may detect the change of the magnetic field of the magnetic member 1641, and the position of the carrier 1630 (and the optical member 1690) may be determined. For example, when viewed along the incident optical axis O1 (the Z axis), the sensor 1680 and the carrier 1630 overlap. In some embodiments, the sensor 1680 or the magnetic member 1641 is disposed on the fixed portion F, and the other of the sensor 1680 or the magnetic member 1641 is disposed on the movable portion M.

Figure 3:
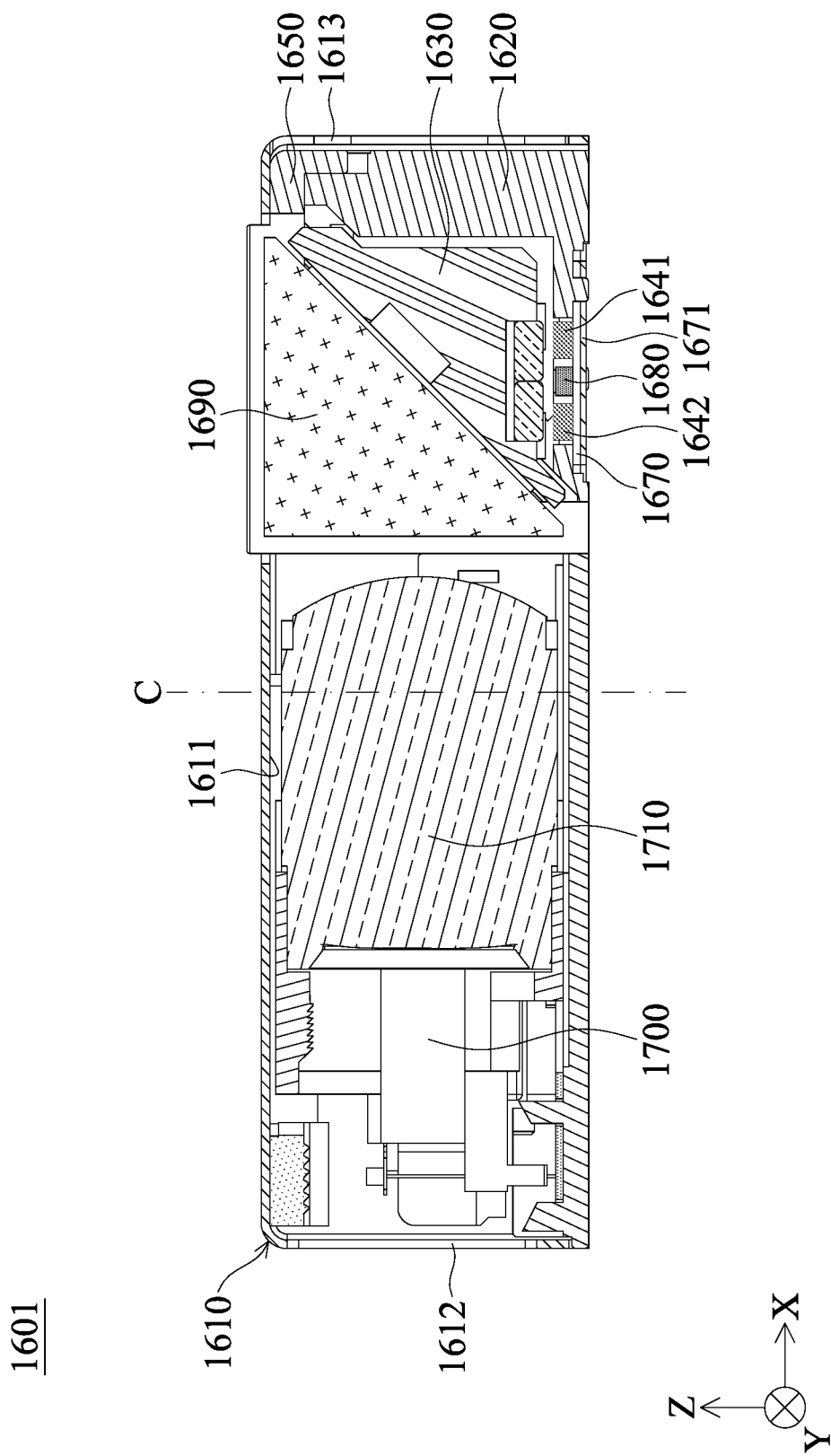
FIG. 3 is a cross-sectional view illustrating along line C-C' shown in FIG. 1.

FIG. 3 is a cross-sectional view illustrating along line C-C' shown in FIG. 1. As shown in FIG. 3, the optical member driving mechanism 1601 has a second side surface 1613 that is opposite to the first side surface 1612. Since the lens driving assembly 1700 is also disposed in the housing 1610, the optical member 1690 is not located at the center of the optical member driving mechanism 1601 (that is, the central axis C does not pass through the optical member 1690). In the present embodiment, the shortest distance between the optical member 1690 and the second side surface 1613 is shorter than the shortest distance between the optical member 1690 and the first side surface 1612. That is, the optical member 1690 is closer to the second side surface 1613. In contrary, the lens driving assembly 1700 and the lens 1710 are closer to the first side surface 1612.

Figure 4:
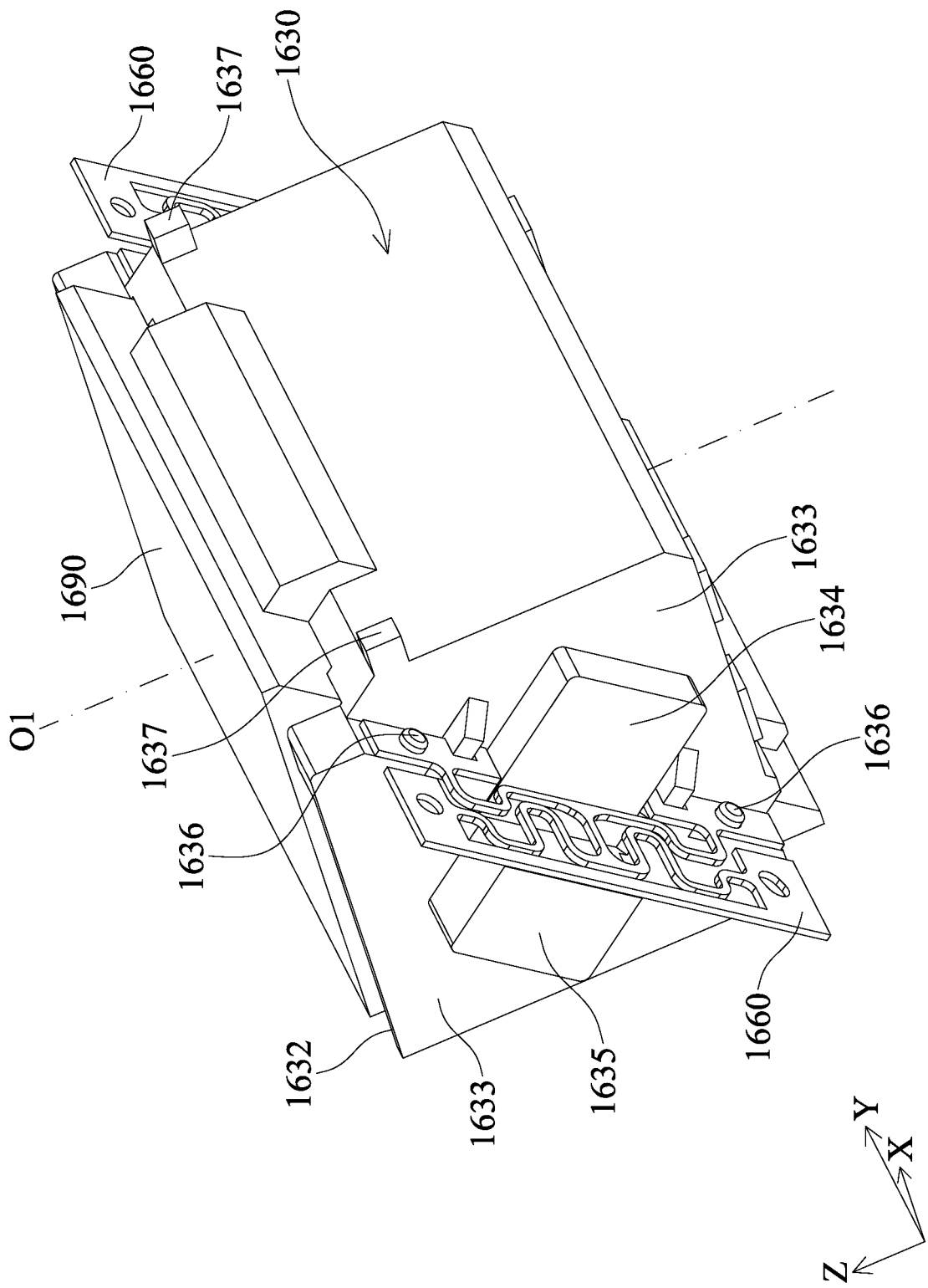
FIG. 4 is a perspective view illustrating a carrier and an elastic member in accordance with an embodiment of the present disclosure.

FIG. 4 is a perspective view illustrating the carrier 1630 and the elastic members 1660 in accordance with an embodiment of the present disclosure. As shown in FIG. 4, the carrier 1630 includes a body 1631 and a sidewall 1633 that extends from an edge (such as an edge 1632) of the body 1631. In addition, the carrier 1630 further includes a first stopping portion 1634 and a second stopping portion 1635 that protrude towards the fixed portion F. The arrangement of the first stopping portion 1634, the second stopping portion 1635 and the fixed portion F will be further discussed in accompany with FIG. 5 as follows. In the present embodiment, the first stopping portion 1634 and the second stopping portion 1635 laterally protrude from the sidewall 1633 to the fixed portion F (i.e. in a horizontal direction). It should be appreciated that although in the present embodiment, the first stopping portion 1634 and the second stopping portion 1635 are illustrated as rectangular structures, but the present embodiment merely serves as an example. Those skilled in the art may design the first stopping portion 1634 and the second stopping portion 1635 to be other shapes as required.

When viewed in a direction (the Y axis) that is perpendicular to the incident optical axis O1, the elastic members 1660 are disposed between the first stopping portion 1634 and the second stopping portion 1635. In the present embodiment, the elastic members 1660 are connected to the carrier 1636 via contacts 1636. The contacts 1636 face the base 1620, and therefore when the optical member 1690 is viewed along the incident optical axis O1, the contacts 1636 are not exposed from the carrier 1630. In other words, when viewed downwards from the top surface 1611 of the optical member driving mechanism 1601, the contacts 1636 are not shown. As a result, when viewed along the incident optical axis O1 (the Z axis), the sidewall 1633 may partially overlap with the elastic members 1660. In addition, when viewed along the incident optical axis O1, the first stopping portion 1634 and the second stopping portion 1635 also overlap the elastic members 1660. By means of the above design, the required space for arranging the elastic members 1660 may be effectively reduced. Therefore, a larger optical member 1690 may be disposed with increasing the volume of the optical member driving mechanism 1601, and the optical performance of the optical member driving mechanism 1601 is enhanced.

Furthermore, the carrier 1630 includes protruding columns 1637 that protrude towards the fixed portion F. The arrangement of the protruding columns 1637 and the fixed portion F will be further discussed in accompany with FIG. 6 as follows. In the present embodiment, the direction in which the protruding columns 1637 extend is different from the direction in which the first stopping portion 1634 and the second stopping portion 1635 extend. For example, the direction in which the protruding columns 1637 extend (i.e., the X axis) is substantially perpendicular to the direction in which the first stopping portion 1634 and the second stopping portion 1635 extend (i.e., the Y axis). By means of the arrangement of the first stopping portion 1634, the second stopping portion 1635 and the protruding columns 1637, the movement of the carrier 1630 in the horizontal direction (which is the X-Y plane) may be limited. As a result, the body 1631 of the carrier 1630 may remain undamaged because the body 1631 moves adequately in such a way that the optical member 1690 being carried by the carrier 1630 is protected. It should be noted that although only one side of the carrier 1630 is illustrated, the other side of the carrier may have a structure that is the same or similar to that shown in FIG. 4. For example, the structure of the carrier 1630 may be symmetrical on both sides.

Figure 5:
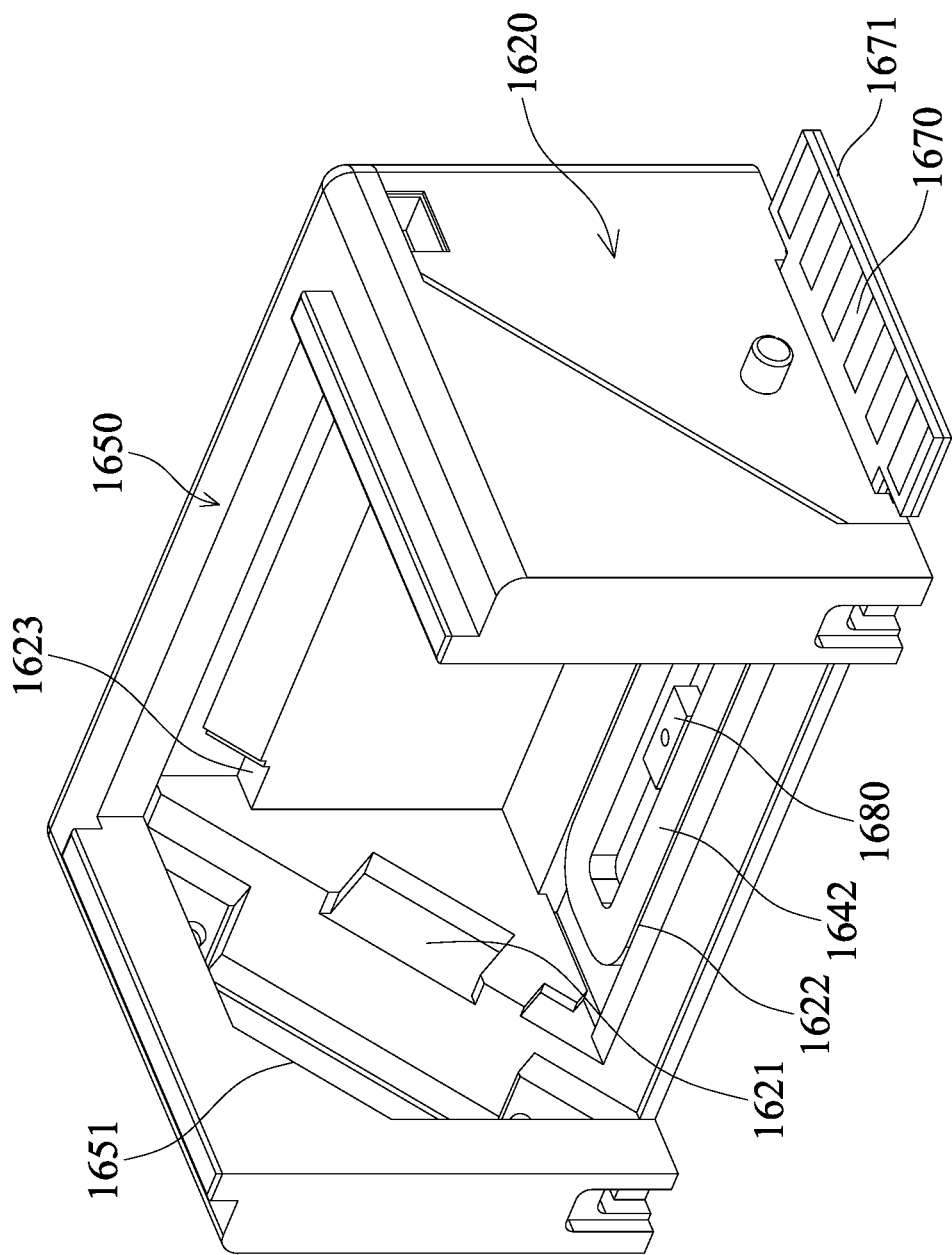
FIG. 5 is a perspective view illustrating a frame and a base in accordance with an embodiment of the present disclosure.

FIG. 5 is a perspective view illustrating the frame 1650, the base 1620 and the circuit component 1670 in accordance with an embodiment of the present disclosure. As shown in FIG. 5, the frame 1650 and the base 1620 may be combined as a rectangular space to contain the movable portion M (including the carrier 1630 and the optical member 1690 carried thereon). In the present embodiment, the base 1620 has a first groove 1621, and the frame 1650 has a second groove 1651. The first groove 1621 is disposed to contain the first stopping portion 1634, and the second groove 1651 is disposed to contain the second stopping portion 1635. In other words, the first groove 1621 is disposed corresponding to the shape of the first stopping portion 1634, and the second groove 1651 is disposed corresponding to the shape of the second stopping portion 1635. As a result, the first groove 1621 and the second groove 1651 may limit the movement of the first stopping portion 1634 and the second stopping portion 1635. Therefore, the carrier 1630 may remain at an adequate position, and the optical member driving mechanism 1601 may keep operating normally. In addition, since when viewed along the incident optical axis O1, the first stopping portion 1634 and the second stopping portion 1635 may overlap with the elastic members 1660, when viewed in the same direction (the incident optical axis O1) as above, the first groove 1621 and the second groove 1651 may overlap with the elastic members 1660 (as shown in FIG. 4).

Moreover, the base 1620 has a base opening 1622 to expose the driving coil 1642 and the sensor 1680. In this way, the driving coil 1642 and the magnetic member 1641 (as shown in FIG. 2) may generate an electromagnetic force, and the sensor 1680 may detect the change of the magnetic field of the magnetic member 1641. It should be noted that in the present embodiment the top surface of the driving coil 1642 is slightly higher than the top surface of the sensor 1680. By means of the above design, the driving coil 1642 may protect the sensor 1680, preventing the movable portion M colliding with the sensor 1680, and thereby the sensor 1680 may remain undamaged. In addition, the base 1620 has a recess 1623 that is formed to contain the protruding columns 1637.

Figure 6:
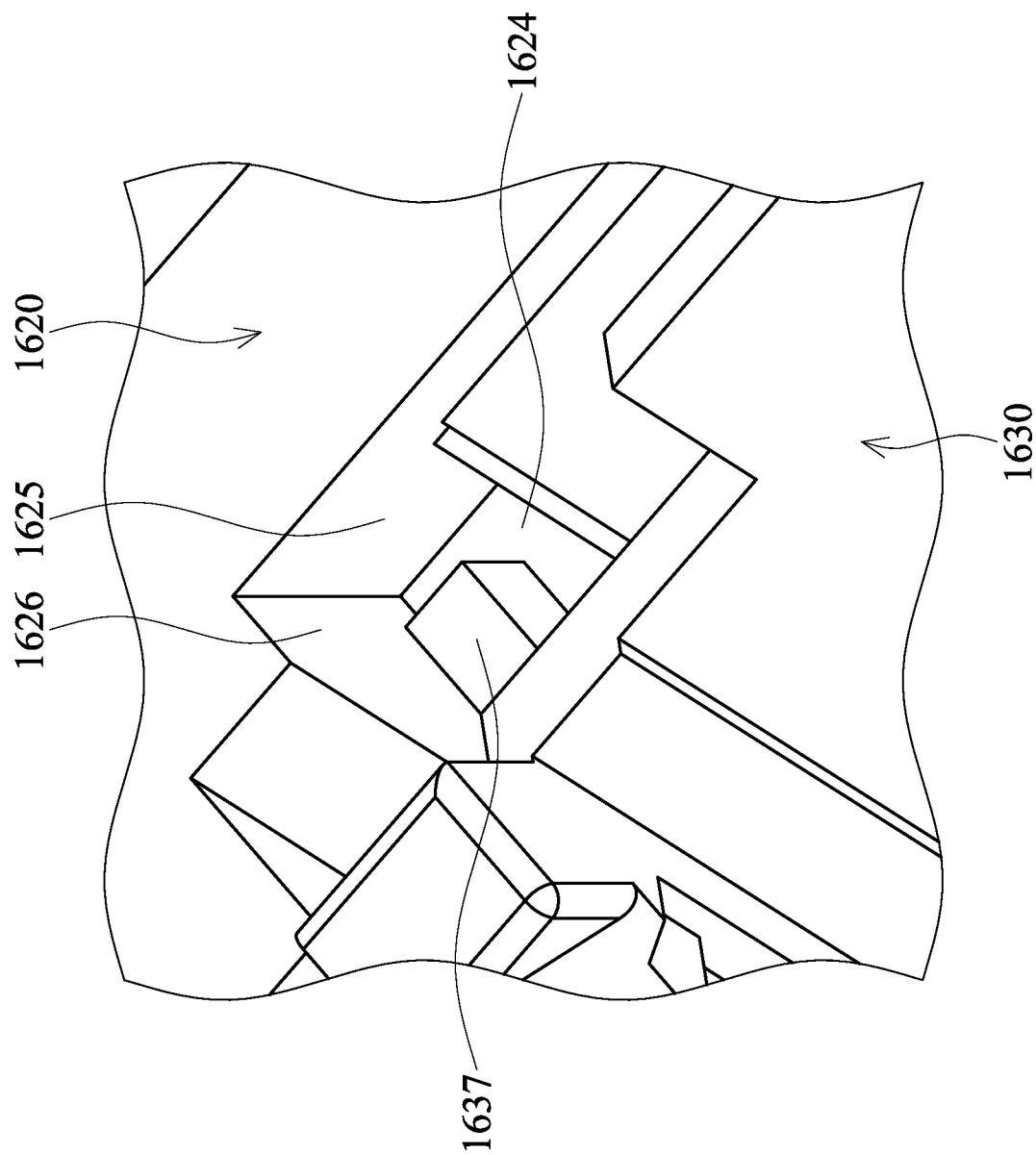
FIG. 6 is an enlarged partial perspective view illustrating the carrier and the base in accordance with an embodiment of the present disclosure.

FIG. 6 is an enlarged partial perspective view illustrating the carrier 1630 and the base 1620 in accordance with an embodiment of the present disclosure. As shown in FIG. 6, the recess 1623 may have a first surface 1624, a second surface 1625 and a third surface 1626. In the present embodiment, the first surface 1624 is a bottom surface of the recess 1623, and substantially parallel to the X-Y plane. The second surface 1625 is a side surface of the recess 1623, and substantially parallel to the Y-Z plane. The third surface 1626 is another side surface of the recess 1623, and substantially parallel to the Z-X plane. In other words, the first surface 1624, the second surface 1625 and the third surface 1626 of the recess 1623 are perpendicular to each other.

In some embodiments, a damping material (not shown) may be filled between the recess 1623 and the protruding columns 1637, such that the damping material contacts the protruding columns 1637 and at least one surface (i.e. at least one of the first surface 1624, the second surface 1625 and the third surface 1626) of the recess 1623. In some embodiments, the damping material may contact the protruding columns 1637 and all surfaces of the recess 1623. Thanks to the arrangement of the damping material, the resonance effect that affecting the movable portion M may be reduced. Furthermore, arranging the protruding columns 1637 and the recess 1623 may increase the surface area of the damping material that contacts the carrier 1630 and the base 1620. As a result, the arrangement of the damping material may be more stable, and the performance of the damping material may be enhanced.

Figure 7:
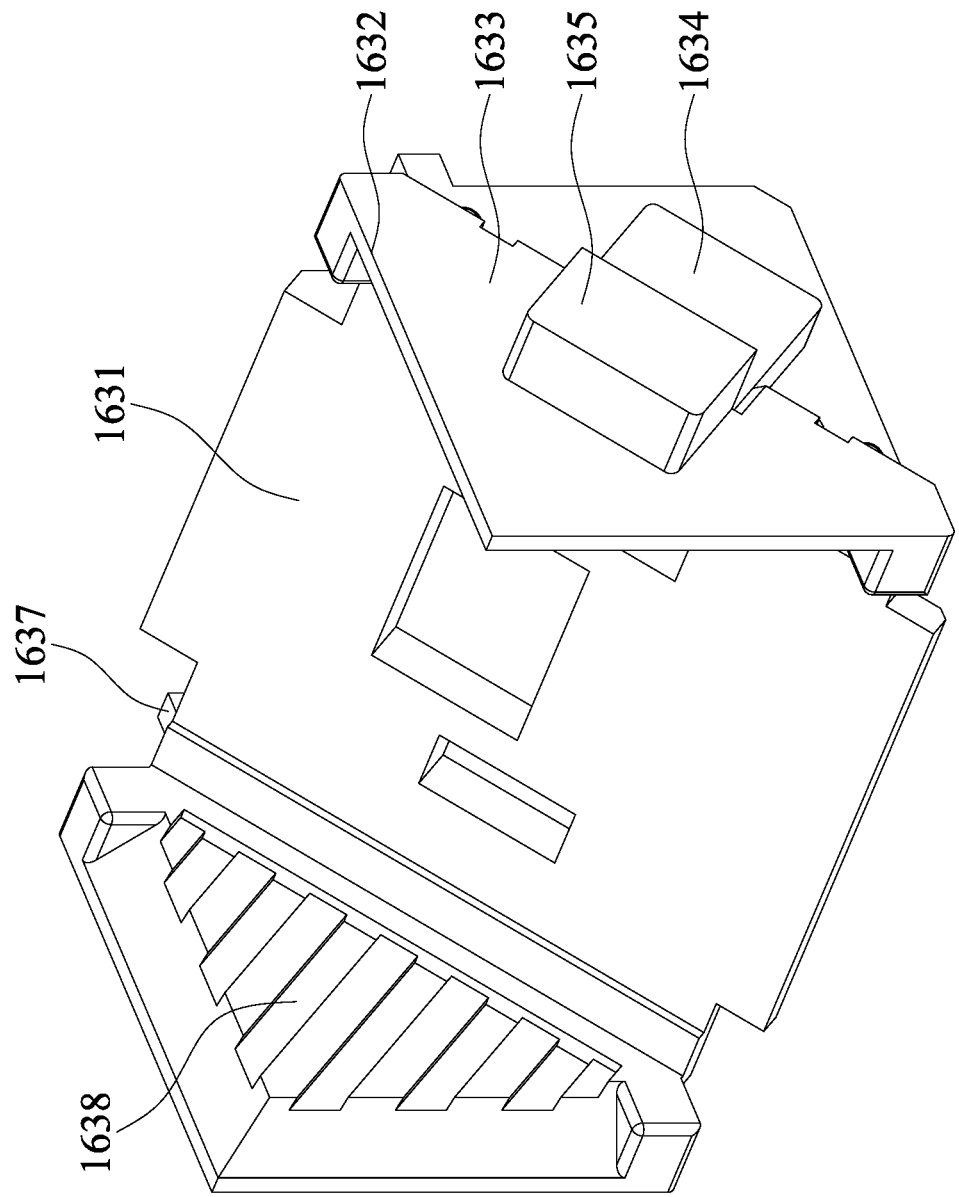
FIG. 7 is a perspective view illustrating the carrier in accordance with an embodiment of the present disclosure.

FIG. 7 is a perspective view illustrating the carrier 1630 in accordance with an embodiment of the present disclosure. In the present embodiment, the carrier 1630 has a plurality of adhesive grooves 1638 that are disposed to face the optical member 1690 (as shown in FIG. 4). An adhesive (not shown) may be filled into the adhesive grooves 1638 to bond the carrier 1630 and the optical member 1690. As shown in FIG. 7, the extending direction of the adhesive grooves 1638 is not parallel to the incident optical axis O1 (the Z axis) and the output optical axis O2 (the X axis). That is, an acute angle is formed between the extending direction of the adhesive grooves 1638 and the incident optical axis O1 (the Z axis), the output optical axis O2 (the X axis). By means of the above design, the difficulty for filling the adhesive into the adhesive grooves 1638 may be reduced, and it helps to evenly distribute the filled adhesive between the carrier 1630 and the optical member 1690.

As set forth above, the embodiments of the present disclosure provide an optical member driving mechanism including an elastic member that overlaps with the sidewall of the carrier. By means of the above design, the required space for arranging the elastic members may be effectively reduced. Therefore, a larger optical member may be disposed with increasing the volume of the optical member driving mechanism, and the optical performance of the optical member driving mechanism is enhanced. In addition, forming an acute angle between the extending direction of adhesive grooves of the carrier and the incident optical axis may reduce the difficulty for filling the adhesive into the adhesive grooves, and it helps to evenly distribute the filled adhesive between the carrier and the optical member.

While the embodiments and the advantages of the present disclosure have been described above, it should be understood that those skilled in the art may make various changes, substitutions, and alterations to the present disclosure without departing from the spirit and scope of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. As long as those may perform substantially the same function in the aforementioned embodiments and obtain substantially the same result, they may be used in accordance with some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. An optical member driving mechanism, comprising:
a fixed portion comprising a base and a frame that is disposed on the base;
a movable portion, movable relative to the fixed portion, comprising a carrier for carrying an optical member with an incident optical axis, wherein the carrier comprises a body and a sidewall that extends along an edge of the body, wherein the carrier further comprises a first stopping portion and a second stopping portion protruding towards the fixed portion;
an electromagnetic driving assembly driving the movable portion to move relative to the fixed portion;
an elastic member, wherein the movable portion is movably connected to the fixed portion via the elastic member; and
a damping material connected to the fixed portion and the movable portion;
wherein the base has a recess facing the carrier;
wherein the carrier further comprises a protruding column protruding towards the fixed portion, and the recess is formed to contain the protruding column;
wherein the damping material contacts the protruding column and at least one surface of the recess.

2. The optical member driving mechanism as claimed in claim 1, wherein the optical member has an outlet optical axis, and the incident optical axis is substantially perpendicular to the outlet optical axis.

3. The optical member driving mechanism as claimed in claim 2, further comprising a lens driving assembly carrying a lens that corresponds to the optical member, wherein the movable portion and the lens driving assembly are arranged in the outlet optical axis.

4. The optical member driving mechanism as claimed in claim 1, wherein the fixed portion further comprises a circuit component, and the base is disposed between the frame and the circuit component.

5. The optical member driving mechanism as claimed in claim 4, wherein the fixed portion further comprises a bottom plate, and the circuit component is disposed between the base and the bottom plate.

6. An optical member driving mechanism, comprising:
a fixed portion comprising a base and a frame that is disposed on the base;
a movable portion, movable relative to the fixed portion, comprising a carrier for carrying an optical member with an incident optical axis, wherein the carrier comprises a body and a sidewall that extends along an edge of the body, wherein the carrier further comprises a first stopping portion and a second stopping portion protruding towards the fixed portion, wherein the carrier further has a plurality of adhesive grooves disposed to face the optical member;
an electromagnetic driving assembly driving the movable portion to move relative to the fixed portion; and
an elastic member, wherein the movable portion is movably connected to the fixed portion via the elastic member;
wherein one of the adhesive grooves extend longer than another of the adhesive grooves.

7. The optical member driving mechanism as claimed in claim 6, wherein an acute angle is formed between an extending direction of the adhesive grooves and the incident optical axis.

8. The optical member driving mechanism as claimed in claim 6, wherein an adhesive is filled into the adhesive grooves to bond the carrier and the optical member.

9. The optical member driving mechanism as claimed in claim 6, wherein the adhesive grooves extend parallel to each other.

10. The optical member driving mechanism as claimed in claim 6, wherein the adhesive grooves are formed on the sidewall of the carrier.

11. The optical member driving mechanism as claimed in claim 10, wherein the first stopping portion and a second stopping portion are formed on the sidewall and opposite to the adhesive grooves.

12. An optical member driving mechanism, comprising:
a fixed portion comprising a base and a frame that is disposed on the base;
a movable portion, movable relative to the fixed portion, comprising a carrier for carrying an optical member with an incident optical axis, wherein the carrier comprises a body and a sidewall that extends along an edge of the body, wherein the carrier further comprises a first stopping portion and a second stopping portion protruding towards the fixed portion, wherein the carrier further has a plurality of adhesive grooves disposed to face the optical member;
an electromagnetic driving assembly driving the movable portion to move relative to the fixed portion; and
an elastic member, wherein the movable portion is movably connected to the fixed Portion via the elastic member;
wherein the adhesive grooves are formed on the sidewall of the carrier;
wherein the first stopping portion and a second stopping portion are formed on the sidewall and opposite to the adhesive grooves;
wherein the optical member has an outlet optical axis, and the incident optical axis is substantially perpendicular to the outlet optical axis.

13. The optical member driving mechanism as claimed in claim 12, wherein when viewed along a direction that is perpendicular to the incident optical axis and the outlet optical axis, the first stopping portion do not overlap with the adhesive grooves.

14. The optical member driving mechanism as claimed in claim 12, wherein when viewed along a direction that is perpendicular to the incident optical axis and the outlet optical axis, the second stopping portion partially overlaps with the adhesive grooves.

15. An optical member driving mechanism, comprising:
a fixed portion comprising a base and a frame that is disposed on the base;
a movable portion, movable relative to the fixed portion, comprising a carrier for carrying an optical member with an incident optical axis, wherein the carrier comprises a body and a sidewall that extends along an edge of the body, wherein the carrier further comprises a first stopping portion and a second stopping portion protruding towards the fixed portion;
an electromagnetic driving assembly driving the movable portion to move relative to the fixed portion;
an elastic member, wherein the movable portion is movably connected to the fixed portion via the elastic member; and a damping material connected to the fixed portion and the movable portion;

wherein the base has a recess facing the carrier;

wherein the carrier further comprises a protruding column protruding towards the fixed portion, and the recess is formed to contain the protruding column;

wherein the recess has a first surface, a second surface and a third surface substantially perpendicular to each other, and the protruding column is spaced apart from the first surface, the second surface and the third surface.

16. An optical member driving mechanism, comprising:

a fixed portion comprising a base and a frame that is disposed on the base;

a movable portion, movable relative to the fixed portion, comprising a carrier for carrying an optical member with an incident optical axis, wherein the carrier comprises a body and a sidewall that extends along an edge of the body, wherein the carrier further comprises a first stopping portion and a second stopping portion protruding towards the fixed portion;

an electromagnetic driving assembly driving the movable portion to move relative to the fixed portion;

an elastic member, wherein the movable portion is movably connected to the fixed portion via the elastic member; and a damping material connected to the fixed portion and the movable portion;

wherein the electromagnetic driving assembly comprises a magnetic member and a driving coil, the magnetic member or the driving coil is disposed on the fixed portion, the other of the magnetic member or the driving coil is disposed on the movable portion, and when viewed along the incident optical axis, the movable portion overlaps with the driving coil and the magnetic member.

* * * * *